United States Patent

Bitschkus

[11] Patent Number: 5,489,087
[45] Date of Patent: Feb. 6, 1996

[54] RADIAL BUSH BEARING

[75] Inventor: Horst Bitschkus, Hilgert, Germany

[73] Assignee: Metzeler Gimetall AG, Munich, Germany

[21] Appl. No.: 471,896

[22] Filed: Jun. 5, 1995

Related U.S. Application Data

[63] Continuation of Ser. No. 245,826, May 19, 1994, abandoned, which is a continuation of Ser. No. 80,392, Jun. 21, 1993, abandoned, which is a continuation of Ser. No. 743,262, Aug. 9, 1991, abandoned.

[30] Foreign Application Priority Data

Aug. 9, 1990 [DE] Germany ............... 40 25 284.1

[51] Int. Cl.$^6$ ............... F16F 1/38; F16F 15/12
[52] U.S. Cl. ............... 267/141; 267/140.3; 267/35; 267/153; 267/292
[58] Field of Search ............... 267/141, 153, 267/152, 292, 293, 294, 145, 140.12, 140.11, 141.1–141.7, 140.3, 280, 281, 282, 35, 229, 219, 220; 264/638, 562, 636; 180/300, 312, 902; 181/208; 403/225–228; 248/634, 635, 627

[56] References Cited

U.S. PATENT DOCUMENTS

| | | | |
|---|---|---|---|
| 2,958,526 | 11/1960 | Ulderup et al. | 267/292 |
| 3,322,377 | 5/1967 | Morlon | 267/141.6 |
| 3,402,924 | 9/1968 | Rix | 267/153 X |
| 4,750,720 | 6/1988 | Wolf et al. | 267/153 X |
| 4,817,926 | 4/1989 | Schwerdt | 267/140.12 |
| 4,925,163 | 5/1990 | Wolf et al. | 267/153 |
| 5,014,967 | 5/1991 | Wolf et al. | 267/153 |
| 5,110,660 | 5/1992 | Wolf et al. | 267/153 X |

FOREIGN PATENT DOCUMENTS

| | | | |
|---|---|---|---|
| 723596 | 6/1942 | Germany. | |
| 2755117 | 1/1985 | Germany. | |
| 4002357 | 1/1991 | Germany | 267/153 |

Primary Examiner—Douglas C. Butler
Attorney, Agent, or Firm—Herbert L. Lerner; Laurence A. Greenberg

[57] ABSTRACT

A radial bush bearing, in particular for motor vehicles, includes a cylindrical outer sleeve, a central bush core disposed in and spaced from the outer sleeve defining an annular gap therebetween, at least one elastomer body being fixed in and completely circumferentially filling the annular gap, and hollow conduits with given cross sections penetrating at least a portion of the at least one elastomer body. The hollow conduits have Venturi-like constrictions and also have enlargements with the given cross sections following the constrictions.

21 Claims, 2 Drawing Sheets

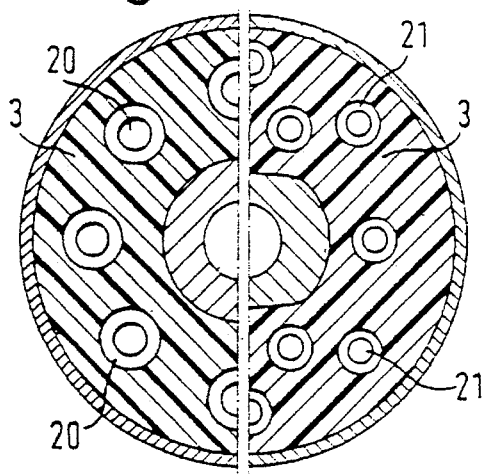
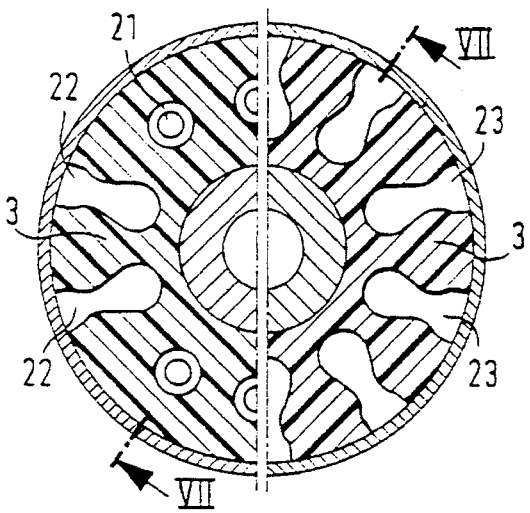
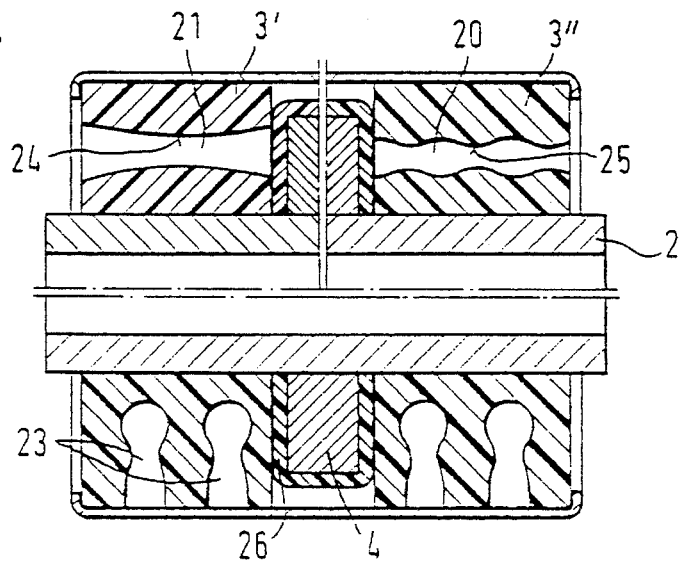
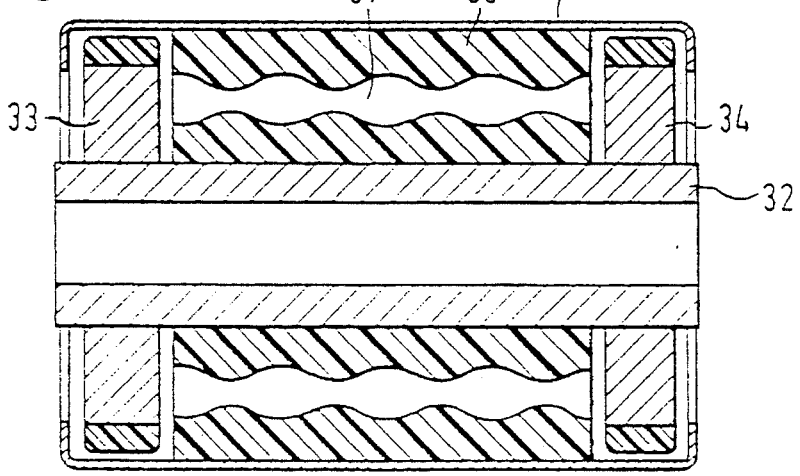

RADIAL BUSH BEARING

This application is continuation of application Ser. No. 08/245,826, filed May 19, 1994, now abandoned; which was a continuation of application Ser. No. 08/080,392, filed Jun. 21, 1993, now abandoned; which was a continuation of application Ser. No. 07/743,262, filed Aug. 9, 1991, now abandoned.

SPECIFICATION

The invention relates to a radial bush bearing, in particular for motor vehicles, having a cylindrical outer sleeve and a central bush core, between which at least one elastomer body is fixed.

Such radial bushings are known for instance from German Patent DE-PS 27 55 117 C2, and generally have two rib-like elastomer bodies between the outer sleeve and the bush core, that are in the form of a V and support the bush core.

However, such bearings are relatively rigid, because the load-bearing rubber cross sections are limited, and moreover the bearings have poor acoustical transmission performance, because only small radiating surface areas are available. Changes in the desired rigidity in various radial directions can furthermore be made by making fundamental changes in construction.

By comparison, it is an object of the invention to provide a radial bush bearing, which overcomes the hereinafore-mentioned disadvantages of the heretofore-known devices of this general type, which has a considerably improved acoustical transmission performance, and in which a variation in rigidity in various radial directions and in the axial direction can be attained with very simple means.

With the foregoing and other objects in view there is provided, in accordance with the invention, a radial bush bearing, in particular for motor vehicles, comprising a cylindrical outer sleeve, a central bush core disposed in and spaced from the outer sleeve defining an annular gap therebetween, at least one elastomer body being fixed in and completely circumferentially filling the annular gap, and hollow conduits with given cross sections penetrating at least a portion of the at least one elastomer body, the hollow conduits having Venturi-like constrictions, and the hollow conduits having enlargements with the given cross sections following the constrictions.

Since the elastomer body is bonded over the entire surface area to both the outer sleeve and the bush core, a large radiating surface area for acoustical vibrations from the bush core to the outside is attained, thus providing considerable acoustical damping in the large-volume rubber body. The hollow conduits extending within the elastomer body, which are known in principle from German Patent DE-PS 723 596, also contribute considerably in this aspect. The disposition and number of these conduits make it possible to establish variable rigidity in various radial directions.

In accordance with another feature of the invention, the bush bearing has a bush axis, and the hollow conduits extend parallel to the bush axis and penetrate the entire length of the at least one elastomer body.

In accordance with a further feature of the invention, the hollow conduits extend radially in a plurality of radial planes in the at least one elastomer body and terminate flush in the at least one elastomer body at a distance from the bush core.

In accordance with an added feature of the invention, the at least one elastomer body has both axially parallel extending conduits and radial conduits ending between the axially parallel conduits.

In accordance with an additional feature of the invention, the axially parallel conduits are disposed at a uniform mutual spacing on a cylindrical surface in the at least one elastomer body.

In accordance with yet another feature of the invention, the axially parallel conduits are radially spaced apart by different distances from the bush axis and/or from each other.

In accordance with yet a further feature of the invention, the axially parallel conduits are spaced apart from one another with a variable meridial or shorter spacing.

In accordance with yet an added feature of the invention, the at least one elastomer body has regions of lesser and regions of greater radial rigidity, the axially parallel conduits are mutually spaced apart by a relatively smaller distance in the regions of lesser radial rigidity, and the axially parallel conduits are mutually spaced apart by a relatively larger distance in the regions of greater radial rigidity.

In accordance with yet an additional feature of the invention, the axially parallel conduits have a larger diameter in regions of lesser radial rigidity than in regions of greater radial rigidity.

In accordance with again another feature of the invention, in terms of limiting the possible deflection of the bush core, the at least one elastomer body is two axially disposed elastomer bodies, and there is provided a radial collar disposed between the elastomer bodies on the bush core as a radial stop.

In accordance with again a further feature of the invention, the at least one elastomer body is constructed in one piece and has two ends, and there are provided collars each being disposed as a radial stop on a respective one of the ends of the elastomer body.

In accordance with again an added feature of the invention, the radial stop or collars have a smaller radial height than the elastomer body or bodies and have an outer periphery with an elastic covering disposed thereon.

In accordance with again an additional feature of the invention, the radial stop is also constructed as an axial stop.

In accordance with still another feature of the invention, the at least one elastomer body has outer and inner peripheries being vulcanized onto the sleeve and the bush core, particularly when there are axially parallel conduits.

In accordance with still a further feature of the invention, the at least one elastomer body has an inner periphery being vulcanized onto the bush core, and the outer sleeve is axially pressed on the at least one elastomer body.

In accordance with still an added feature of the invention, the at least one elastomer body has an outer periphery being vulcanized onto the sleeve, and the bush core is pressed into the at least one elastomer body.

In accordance with a concomitant feature of the invention, the at least one elastomer body is fully vulcanized separately and is subsequently injected into the annular gap between the outer sleeve and the bush core.

Other features which are considered as characteristic for the invention are set forth in the appended claims.

Although the invention is illustrated and described herein as embodied in a radial bush bearing, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

FIG. 5 is a cross-sectional view of a radial bush bearing having two variants in a geometric configuration of axial conduits;

FIG. 6 is a cross-sectional view of such a radial bush bearing with radial conduits;

FIG. 7 is a longitudinal-sectional view of a radial bush bearing taken along the line VII—VII of FIG. 6, in the direction of the arrows, having differently constructed axial and radial conduits; and FIG. 8 is a longitudinal-sectional view of a radial bush bearing having a one-piece elastomer body and radial stops located on the outside on the end surfaces.

Figure 1:
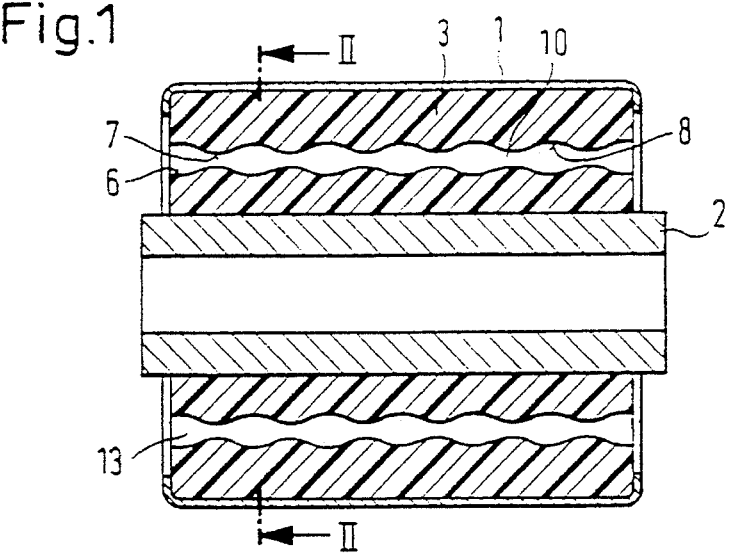
FIG. 1 is a diagrammatic, longitudinal-sectional view of a radial bush bearing in a standard, one-piece version.
Figure 2:
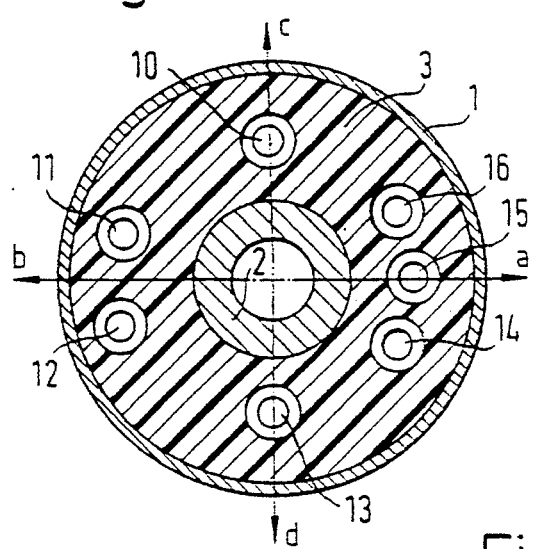
FIG. 2 is a cross-sectional view of this bearing taken along a section line II—II of FIG. 1, in the direction of the arrows, with a different configuration of hollow conduits.

Referring now to the figures of the drawing in detail and first, particularly, to the longitudinal and cross-sectional views in FIGS. 1 and 2 thereof, it is seen that a radial bush bearing has a cylindrical outer sleeve 1 and a central, likewise cylindrical bush core 2, with a space therebetween which is completely filled with an elastomer body 3.

A number of hollow conduits 10-16 which extend parallel to the bush axis are provided inside the elastomer body 3 and penetrating it over its entire length. These hollow conduits, of which the conduits 10 and 13 can be seen in the longitudinal section of FIG. 1, have Venturi-like constrictions 7 beginning at a maximum inlet cross section 6. The constrictions 7 are adjoined by corresponding expansions 8 in a steady curve course. The shape of these hollow conduits provides better acoustical insulation and moreover enables easier unmolding or removal from a mold of the corresponding mold cores.

As can be seen from the cross section of FIG. 2, the hollow conduits 10-16 are provided in a variable distribution within the elastomer body 3, in order to obtain different rigidities in different radial directions, since the rigidity decreases with an increase of such hollow conduits in the particular region.

Figure 3:
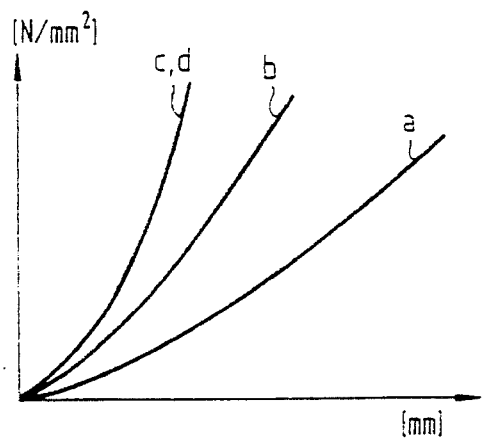
FIG. 3 is a diagram of rigidities in various radial directions of the bush of FIG. 2.

In order to clearly show the influence of the number of hollow conduits, the forces required for various force directions are plotted over the corresponding deflections in the diagram of FIG. 3. Regarding this point, it can be seen from FIG. 2 that in a force direction a, a total of three hollow conduits 14, 15 and 16 are disposed in the elastomer body 3, so that the bush bearing has the least rigidity in this direction, which is also apparent from a curve a in the diagram of FIG. 3. In an opposite direction b, only two hollow conduits 11 and 12 are provided, resulting in a greater rigidity b as is shown by the diagram of FIG. 3. The rigidity is the greatest in vertical directions c and d, since there only one respective hollow conduit 10 and 13 is provided for each. Through the use of a suitable selection of the geometric configuration and number of the hollow conduits, or the selection of their diameter, the rigidity in such a radial bush bearing can be adjusted to be different in various radial directions.

Figure 4:
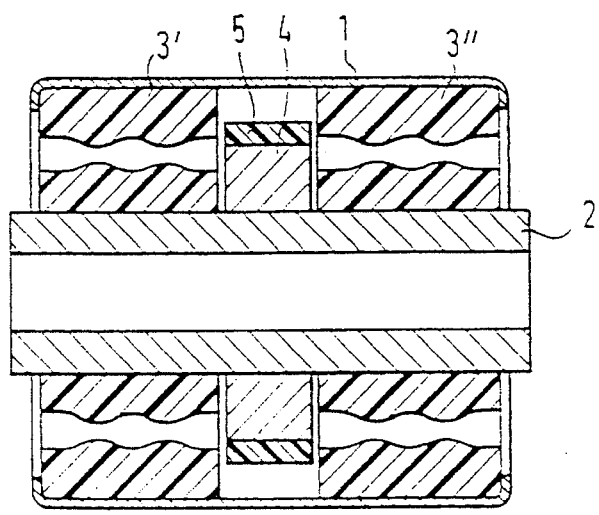
FIG. 4 is a longitudinal-sectional view of the same type of bearing with a central radial stop.

FIG. 4 shows the same kind of radial bearing and longitudinal section, but it additionally has a central radial stop 4. This radial stop is in the form of a ring that is slipped onto the bush core 2, or it is constructed as a collar which is formed directly onto the core, and in each case it has an outer diameter that is smaller than the inside diameter of the outer sleeve 1. The stop 4 can additionally have an elastic covering 5 on the outer periphery thereof, in order to soften the impact.

Through the use of the central disposition of the radial stop 4, the elastomer body 3 is constructed in two identical parts 3' and 3", which are symmetrically disposed on both sides with respect to the radial stop.

FIG. 5 shows two further possible embodiments of the geometrical configuration of the conduits. The left half of the cross section shows the conduits 20 disposed at uniform intervals on a cylinder jacket inside the elastomer body 3.

This produces a bush bearing that has the same rigidity in all radial directions.

On the right half of FIG. 5, hollow conduits 21 are shown that have a lesser diameter than the conduits 20 on the left, and moreover in which the bush bearing differs in its rigidity only in the axial direction and in the horizontal direction. This is attained by placing hollow conduits 21 closer together in the vertical direction.

In the exemplary embodiment of FIG. 6, it can be seen from the cross section which is shown that the hollow conduits may also be constructed as blind radial conduits 22 and 23 that are open at only one end and end within the interior of the elastomer body 3. In the left half of the drawing, both axial conduits 21 and radial conduits 22 disposed in the horizontal region are provided. These radial conduits 22 generally enable better adjustment and adaptation of the axial rigidity of this kind of bush. In the right half of FIG. 6, only radial conduits 23 are provided in corresponding radial planes.

As can be seen from the longitudinal section of FIG. 7, the radial conduits 23 are disposed beside one another in a plurality of radial planes. However, the axial conduits may have some other shape differing from the configuration of FIG. 1. For instance, in the top left part of the drawing, the conduit 21 may have only a single, central, Venturi-like constriction 24, while on the right-hand side hollow conduits 20 having Venturi-like constrictions 25 in close succession are provided.

In this drawing figure, the radial stop 4 has a softer covering 26, not only on the outer periphery but also on its end surfaces, and can thus serve as an axial stop for the bush as well.

In the exemplary embodiment of FIG. 8, an elastomer body 30 with hollow conduits 31 thereof is constructed in one piece. In this case, a bush core 32 has one corresponding radial stop 33, 34 on each of two end surfaces of the elastomer body 30.

In the bush bearings of FIGS. 1 and 2 on one hand and of FIGS. 4 and 5 on the other hand, having only axial conduits, it is possible for the elastomer body 3 to be bonded directly to the outer sleeve 1 and the bush core 2, or in other words to be vulcanized onto them. In an embodiment with radial conduits corresponding to FIG. 6, it is more practical for the elastomer body to be bonded only to the bush core 2, while the outer sleeve 1 is then pressed on and flanged over on the ends.

However, it is also possible to produce the elastomer body separately at first and then to inject it, suitably with initial tension, into the space between the outer sleeve and the bush core.

The overall result is accordingly a radial bush bearing that has very good acoustical transmission performance, and in which different axial and radial rigidities, the latter also with respect to different radial directions, can be established by simple means.

I claim:

1. A radial bush bearing, comprising a cylindrical outer sleeve defining an axial direction, a central bush core disposed in and spaced from said outer sleeve defining an annular gap therebetween, at least one elastomer body being fixed in and completely circumferentially filling said annular gap, said elastomer body being subject to radial compression as a major component of force acting on the radial bush bearing, and hollow conduits with given cross sections penetrating said at least one elastomer body in the axial direction, said hollow conduits being formed directly in said elastomeric material and having Venturi-like constrictions and smoothly merging transitions from regions with said given cross sections to said Venturi-like constrictions and smoothly merging transitions following said constrictions, wherein, when said elastomer body is radially compressed, said constrictions come into mutual contact first and, upon further compression, said hollow conduits collapse as well.

2. The radial bush bearing according to claim 1, wherein the bush bearing has a bush axis, and said hollow conduits extend parallel to the bush axis and penetrate the entire length of said at least one elastomer body.

3. The radial bush bearing according to claim 2, wherein said axially parallel conduits are disposed at a uniform mutual spacing on a cylindrical surface in said at least one elastomer body.

4. The radial bush bearing according to claim 3, wherein said at least one elastomer body has outer and inner peripheries being vulcanized onto said sleeve and said bush core.

5. The radial bush bearing according to claim 2, wherein said axially parallel conduits are radially spaced apart by different distances from the bush axis.

6. The radial bush bearing according to claim 5, wherein said at least one elastomer body has outer and inner peripheries being vulcanized onto said sleeve and said bush core.

7. The radial bush bearing according to claim 2, wherein said axially parallel conduits are spaced apart from one another with a variable meridial spacing.

8. The radial bush bearing according to claim 7, wherein said at least one elastomer body has outer and inner peripheries being vulcanized onto said sleeve and said bush core.

9. The radial bush bearing according to claim 2, wherein said at least one elastomer body has regions of lesser and regions of greater radial rigidity, and said axially parallel conduits have larger diameters in said regions of lesser radial rigidity.

10. The radial bush bearing according to claim 2, wherein said at least one elastomer body has an inner periphery being vulcanized onto said bush core, and said outer sleeve is axially pressed on said at least one elastomer body.

11. The radial bush bearing according to claim 2, wherein said at least one elastomer body has an outer periphery being vulcanized onto said sleeve, and said bush core is pressed into said at least one elastomer body.

12. The radial bush bearing according to claim 2, wherein said at least one elastomer body is fully vulcanized separately and is subsequently injected into said annular gap between said outer sleeve and said bush core.

13. The radial bush bearing according to claim 1, wherein said hollow conduits extend radially in a plurality of radial planes in said at least one elastomer body and terminate flush in said at least one elastomer body at a distance from said bush core.

14. The radial bush bearing according to claim 1, wherein said at least one elastomer body has axially parallel conduits and radial conduits ending between said axially parallel conduits.

15. The radial bush bearing according to claim 1, wherein said at least one elastomer body has regions of lesser and regions of greater radial rigidity, said axially parallel conduits are mutually spaced apart by a relatively smaller distance in said regions of lesser radial rigidity, and said axially parallel conduits are mutually spaced apart by a relatively larger distance in said regions of greater radial rigidity.

16. The radial bush bearing according to claim 1, wherein said at least one elastomer body is two axially disposed elastomer bodies, and including a radial collar disposed between said elastomer bodies and said bush core as a radial stop.

17. The radial bush bearing according to claim 16, wherein said radial stop has a smaller radial height than said elastomer bodies and has an outer periphery with an elastic covering disposed thereon.

18. The radial bush bearing according to claim 17, wherein said radial stop is also constructed as an axial stop.

19. The radial bush bearing according to claim 1, wherein said at least one elastomer body is constructed in one piece and has two ends, and including collars each being disposed as a radial stop on a respective one of said ends of said elastomer body.

20. The radial bush bearing according to claim 19, wherein said collars have a smaller radial height than said elastomer body and outer peripheries with elastic coverings disposed thereon.

21. The radial bush bearing according to claim 20, wherein said collars are also constructed as axial stops.

* * * * *